US012609945B1

(12) United States Patent
Zhang

(10) Patent No.: US 12,609,945 B1
(45) Date of Patent: Apr. 21, 2026

(54) METHOD, PROGRAMMABLE SWITCH, AND COMPUTER PROGRAM PRODUCT FOR DETECTING NETWORK ATTACK

(71) Applicant: Dell Products L.P., Round Rock, TX (US)

(72) Inventor: Weibing Zhang, Beijing (CN)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 18/942,860

(22) Filed: Nov. 11, 2024

(30) Foreign Application Priority Data

Oct. 18, 2024  (CN) .......................... 202411463646.3

(51) Int. Cl.
| | |
|---|---|
| *H04L 9/40* | (2022.01) |
| *G06F 21/55* | (2013.01) |
| *H04L 41/16* | (2022.01) |
| *G06F 21/56* | (2013.01) |

(52) U.S. Cl.
CPC ........ *H04L 63/1416* (2013.01); *G06F 21/552* (2013.01); *H04L 41/16* (2013.01); *H04L 63/1408* (2013.01); *H04L 63/1466* (2013.01); *G06F 21/55* (2013.01); *G06F 21/566* (2013.01); *H04L 63/1433* (2013.01)

(58) Field of Classification Search
CPC ...... G06F 21/55; G06F 21/552; G06F 21/554; G06F 21/56; G06F 21/566; H04L 63/14; H04L 63/1408; H04L 63/1416; H04L 63/1433; H04L 63/1441; H04L 63/1466
See application file for complete search history.

(56) References Cited

U.S. PATENT DOCUMENTS

| | | | | |
|---|---|---|---|---|
| 11,748,475 | B1* | 9/2023 | Berk ..................... | G06F 21/564 726/22 |
| 2018/0322281 | A1* | 11/2018 | Borlick ................. | G06F 21/554 |
| 2020/0387430 | A1* | 12/2020 | Hironaka ............ | G06F 11/1469 |

(Continued)

OTHER PUBLICATIONS

Microsoft, "SMB Compression," https://learn.microsoft.com/en-us/windows-server/storage/file-server/smb-compression, Sep. 2, 2022, 8 pages.

(Continued)

*Primary Examiner* — Shaqueal D Wade-Wright
(74) *Attorney, Agent, or Firm* — Ryan, Mason & Lewis, LLP

(57) ABSTRACT

A method in an illustrative embodiment includes registering a storage system of a server with a programmable switch for transmitting and compressing data. The method further includes transmitting read data and write data associated with the storage system between the server and a client by the programmable switch. The method further includes determining a compression ratio of the read data and a compression ratio of the write data for a connection between the client and the programmable switch. The method further includes detecting a network attack based on the compression ratio of the read data and the compression ratio of the write data. In this way, abnormal data can be quickly and effectively identified without consuming a large quantity of resources, and whether a network attack exists can be determined, thereby maintaining the performance of a storage server while reducing the consumption of resources.

20 Claims, 7 Drawing Sheets

(56) References Cited

U.S. PATENT DOCUMENTS

| | | | | |
|---|---|---|---|---|
| 2024/0086334 A1* | 3/2024 | Ashino | ................... | G06F 12/14 |
| 2024/0330457 A1 | 10/2024 | Zhang | | |
| 2025/0190562 A1* | 6/2025 | Moore | ................. | G06F 21/554 |
| 2025/0373632 A1* | 12/2025 | Cooper | .............. | H03M 7/4043 |

OTHER PUBLICATIONS

R. Braden, "FTP Data Compression," Network Working Group, Request for Comment: 468, https://datatracker.ietf.org/doc/html/rfc468, Mar. 8, 1973, 7 pages.
Linux, "Linux Manual Page, "BSD General Commands Manual SFTP(1), https://www.man7.org/linux/man-pages/man1/sftp.1.html, Sep. 19, 2022, 10 pages.
IBM, "When Should I Compress Data for Encryption?" https://www.ibm.com/docs/en/zos/2.4.0?topic=data-when-should-i-compress-encryption, Apr. 8, 2021, 2 pages.
Stack Exchange Network, "Encryption and Compression of Data," https://security.stackexchange.com/questions/19969/encryption-and-compression-of-data, Accessed Dec. 30, 2022, 4 pages.

* cited by examiner

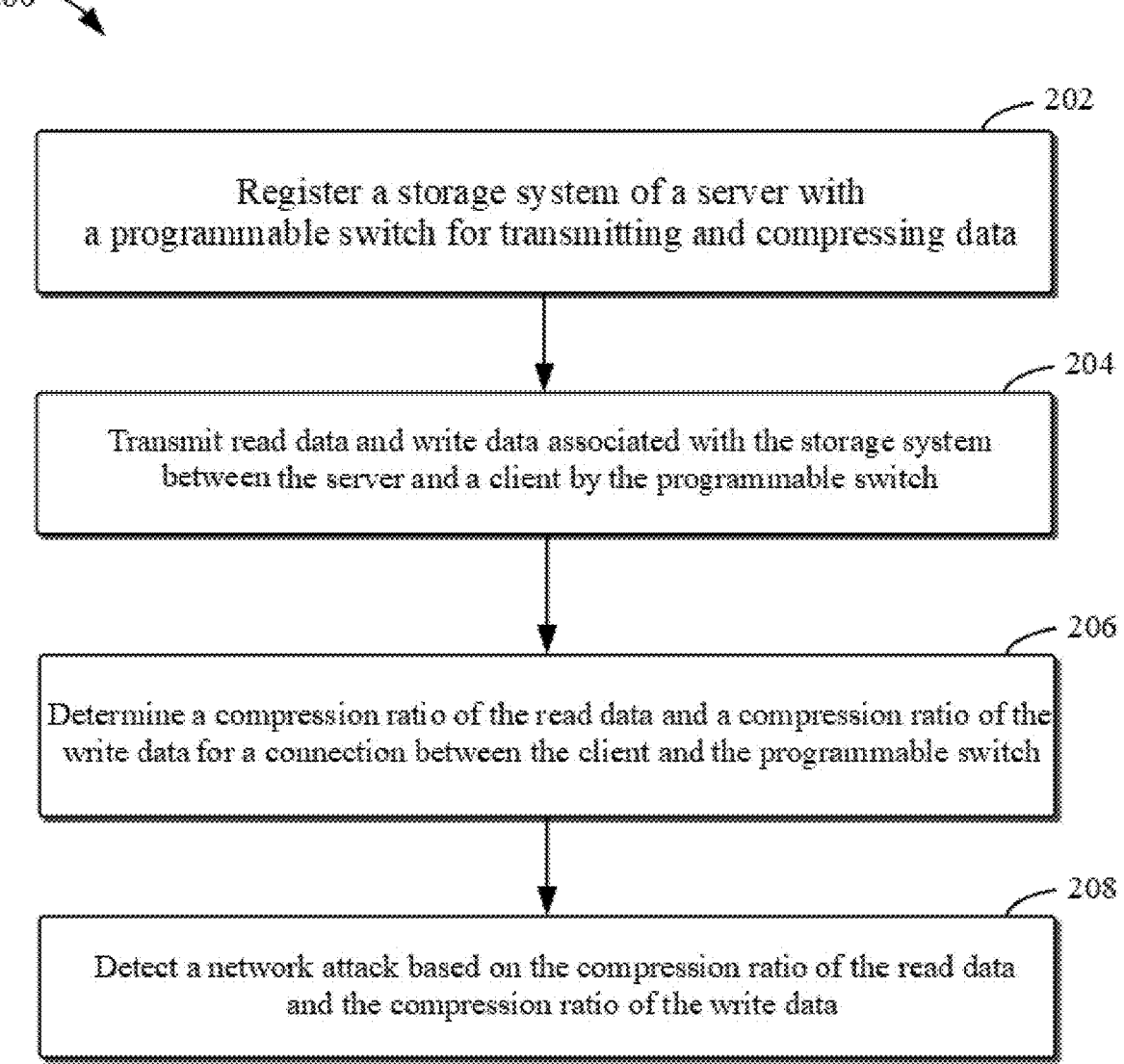

200

202

Register a storage system of a server with
a programmable switch for transmitting and compressing data

204

Transmit read data and write data associated with the storage system
between the server and a client by the programmable switch

206

Determine a compression ratio of the read data and a compression ratio of the
write data for a connection between the client and the programmable switch

208

Detect a network attack based on the compression ratio of the read data
and the compression ratio of the write data

METHOD, PROGRAMMABLE SWITCH, AND COMPUTER PROGRAM PRODUCT FOR DETECTING NETWORK ATTACK

RELATED APPLICATION

The present application claims priority to Chinese Patent Application No. 202411463646.3, filed Oct. 18, 2024, and entitled "Method, Programmable Switch, and Computer Program Product for Detecting Network Attack," which is incorporated by reference herein in its entirety.

FIELD

The present disclosure relates to the field of computers, and more specifically, to a method, a programmable switch, and a computer program product for detecting a network attack.

BACKGROUND

A network attached storage (NAS) server is a device that implements data storage and access through a network. When a user needs to read data, a data read instruction is sent to the NAS server through a client device. After the NAS server receives the instruction, its built-in storage system will locate and read data requested by the user, and then send the data obtained by reading back to the client through the network to meet the read requirement of the user.

In addition to a data read function, the NAS server further supports a data write operation. The user can send new data or modified data to the NAS server through the client device. After the NAS server receives the data, its storage system will check and store the data to ensure the integrity and security of the data. In addition, the user can also process, such as edit and modify, the data read from the storage system, and then send the processed data back to the NAS server for storage.

SUMMARY

Embodiments of the present disclosure provide a method, a programmable switch, and a computer program product for detecting a network attack.

In a first aspect of embodiments of the present disclosure, a method for detecting a network attack is provided. The method includes registering a storage system of a server with a programmable switch for transmitting and compressing data. The method further includes transmitting read data and write data associated with the storage system between the server and a client by the programmable switch. The method further includes determining a compression ratio of the read data and a compression ratio of the write data for a connection between the client and the programmable switch. The method further includes detecting the network attack based on the compression ratio of the read data and the compression ratio of the write data.

In a second aspect of embodiments of the present disclosure, a programmable switch is provided. The programmable switch includes at least one processor, and memory coupled to the at least one processor and having instructions stored therein. The instructions, when executed by the at least one processor, cause the programmable switch to perform actions that include transmitting read data and write data associated with a storage system between a server and a client, determining a compression ratio of the read data and a compression ratio of the write data for a connection between the client and the programmable switch, and detecting a network attack based on the compression ratio of the read data and the compression ratio of the write data.

In a third aspect of embodiments of the present disclosure, a computer program product is provided. The computer program product is tangibly stored on a non-transitory computer-readable medium and comprises machine-executable instructions. The machine-executable instructions, when executed by a machine, cause the machine to perform actions that include registering a storage system of a server with a programmable switch for transmitting and compressing data, transmitting read data and write data associated with the storage system between the server and a client by the programmable switch, determining a compression ratio of the read data and a compression ratio of the write data for a connection between the client and the programmable switch, and detecting a network attack based on the compression ratio of the read data and the compression ratio of the write data.

It should be understood that the content described in this Summary is neither intended to limit key or essential features of embodiments of the present disclosure, nor intended to limit the scope of the present disclosure. Other features of the present disclosure will become readily understood from the additional description provided herein.

BRIEF DESCRIPTION OF THE DRAWINGS

The above-mentioned and other features, advantages, and aspects of embodiments of the present disclosure will become more apparent with reference to the accompanying drawings and the following Detailed Description. In the accompanying drawings, identical or similar reference numerals represent identical or similar elements, in which:

FIG. 2 is a flow chart of a method for detecting a network attack according to some embodiments of the present disclosure;

DETAILED DESCRIPTION

Figure 1:
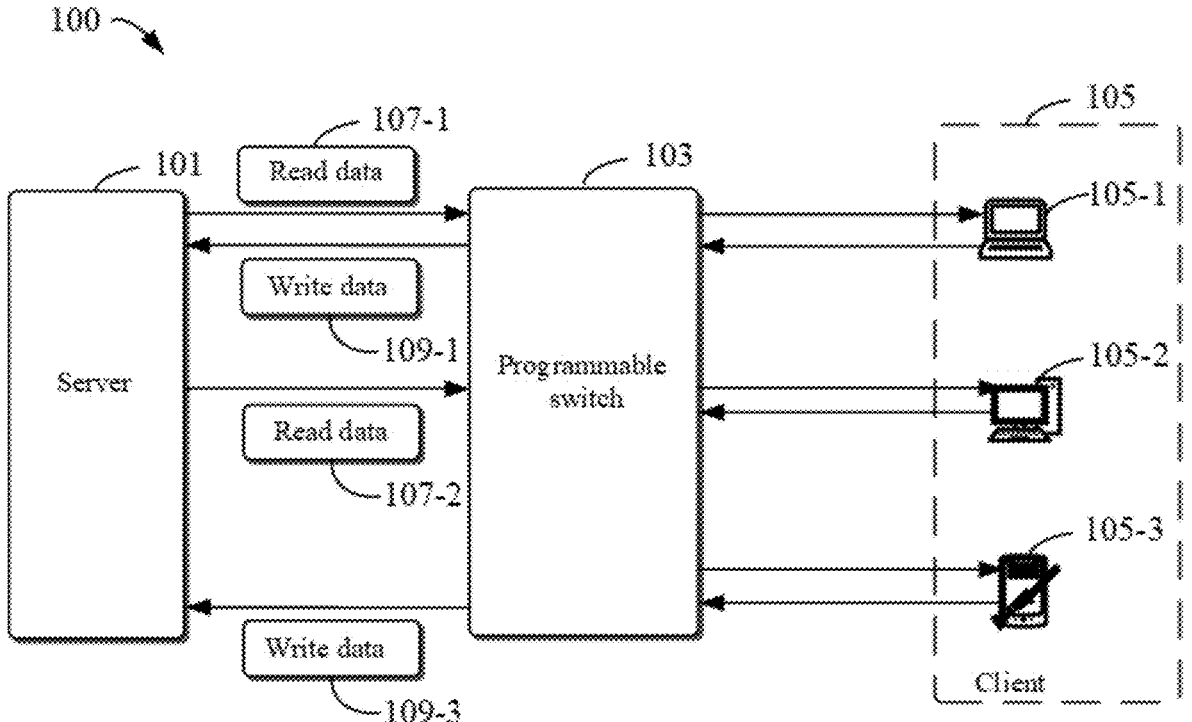
FIG. 1 is a schematic diagram of an example environment in which embodiments of the present disclosure can be implemented.

Illustrative embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be construed as "at least one embodiment." The terms "first," "second," and the like may refer to different or the same objects. Other explicit and implicit definitions may also be included below.

As mentioned above, in a practical application such as an NAS server, a user often processes data read from the server and then writes it back. However, in this process, if a client device is subjected to a network attack, such as ransomware intrusion, the written data may be encrypted or tampered with. The ransomware, by encrypting user data, forces the user to pay a ransom to obtain a decryption key, which seriously affects the data security and user experience. Such attacks not only threaten the integrity of data, but also cause economic loss and a crisis of trust.

When dealing with network attacks such as ransomware, a file integrity check is usually used as a common detection method in the related art, but this method requires traversing a large amount of data on a storage server for attack detection, and this process consumes large amounts of resources, and may significantly affect the performance of the storage server. At the same time, although system-wide attack detection can detect the existence of an attack, it is often difficult to pinpoint a specific source of the attack. This is because the detection process is highly dependent on the existing data in the system, and once the data is encrypted or tampered with, an attack path is difficult to be traced. In addition, when the detection system finds a network attack, in order to prevent further data damage, the system usually takes a comprehensive access blocking measure. This approach can protect the data security to some extent; however, it may lead to service interruptions, thereby affecting the normal use of the user.

For this reason, embodiments of the present disclosure provide a solution for detecting a network attack. The method in an illustrative embodiment includes registering a storage system of a server with a programmable switch, the programmable switch being for transmitting read data and write data associated with the storage system between the server and a client, then determining a compression ratio of the read data and a compression ratio of the write data for a connection between the client and the programmable switch, and detecting a network attack based on the compression ratio of the read data and the compression ratio of the write data. In this way, abnormal data can be quickly and effectively identified without consuming a large quantity of computing resources, and whether a network attack exists can be determined, thereby maintaining the performance of a storage server while reducing the resource consumption of the detection process. In addition, since the detection is performed at the connection level of the programmable switch, when a network attack is detected, the attacked client can be quickly located, which improves the protection level for data security, and also reduces service interruptions caused by false alarms or excessive protection, thereby improving the user experience.

FIG. 1 is a schematic diagram of an example environment 100 in which embodiments of the present disclosure can be implemented. As shown in FIG. 1, the example environment 100 may include a server 101, and the server 101 may be used for data storage and management, and can securely and in an orderly manner save various types of data uploaded by a user, thereby ensuring data integrity and availability. The server 101 may further be configured with a data read and response mechanism, and when a user issues a data read command through a client device, the server 101 can identify and parse the command and locate a storage location of data required by the user. Subsequently, the server 101 can transmit the read data to the user through a network, thereby meeting a data access requirement of the user. In embodiments of the present disclosure, the server 101 may be a server having a storage system, such as an NAS server, a file server, or a database server.

Still referring to FIG. 1, the example environment 100 may also include a programmable switch 103 and a client 105 connected to the programmable switch 103. The programmable switch 103 may include functions such as data transmission, data compression, traffic control, and security policy implementation, and a core characteristic of the programmable switch 103 is its programmability, which allows defining and modifying, by software programming, its rules for forwarding and processing data. The programmable switch 103 is provided with a plurality of physical or virtual interfaces, each interface being correspondingly and independently connectable to a particular device in the client 105, thereby enabling fine traffic management in a complex network environment. The client 105 may include a plurality of types of terminal devices such as a smart phone, a personal computer, and a tablet computer, for example, a terminal device 105-1, a terminal device 105-2, and a terminal device 105-3, each of which has a corresponding Media Access Control (MAC) address when accessing a network. By parsing the MAC address information in a data packet, the programmable switch 103 is able to precisely identify and track which data is read or written by which particular device.

In embodiments of the present disclosure, the server 101 may register the storage system with a protocol layer of the programmable switch 103. When a user needs to read data, by taking the terminal device 105-1 as an example, a data read instruction is sent to the server 101 through the terminal device 105-1. After the server 101 receives the instruction, its built-in storage system locates and reads read data 107-1 requested by the user, and then sends the read data 107-1 back to the terminal device 105-1 through the programmable switch 103, thereby meeting the read requirement of the user. After receiving the read data 107-1, the user may also perform editing, modification, and other processing on the read data 107-1, and then send the processed write data 109-1 back to the server 101 for storage. A given terminal device of the client 105 may also perform only the read operation or the write operation. For example, the terminal device 105-2 sends a data read instruction to the server 101, and the server 101, after receiving the instruction, reads read data 107-2 requested by the user, and then sends the read data 107-2 back to the terminal device 105-2 through the programmable switch 103. For another example, the terminal device 105-3 generates write data 109-3, and the programmable switch 103 sends the write data 109-3 to the server 101 for storage.

In embodiments of the present disclosure, the programmable switch 103 has a compression function, and can compress the read data and the write data transmitted between the client 105 and the server 101, and determine whether a terminal device in the client 105 is subjected to a network attack according to the compression ratios of the read data and the write data. For example, when a certain terminal device is subjected to a ransomware attack, read data may be encrypted on the terminal device, so that the user may need to pay for the required data at the next request, and the encrypted data, that is, write data, may not be able to be compressed when it is written back to the server 101. Therefore, whether a network attack exists in the terminal device may be detected by a difference between the compression ratios of the read data and the write data. For example, when it is detected that the difference between the compression ratio of the read data 107-1 and the compression ratio of the write data 109-1 is excessively high, it may be determined that a network attack exists in the terminal device 105-1.

In some embodiments, read data and write data may be acquired for the connection between a terminal device in each client 105 and the programmable switch 103, and the detection of a network attack may be conducted based on compression ratios of the read data and the write data. For example, when a certain terminal device has a large compression ratio of the read data but a significantly reduced compression ratio of the write data or a small compression ratio of the read data but a significantly increased compression ratio of the write data, it may indicate that the device is being subjected to some form of network attack. This compression ratio-based detection method not only has high accuracy and efficiency, but also can cover a variety of types of network attacks, such as ransomware attacks and data tampering.

In addition, since the detection is performed at the connection level of the programmable switch, when a network attack is detected, the attacked client can be quickly located, which improves the protection level for data security, and also reduces service interruptions caused by false alarms or excessive protection, thereby improving the user experience. In addition to detecting a network attack based on a difference between compression ratios of read data and write data, a comprehensive determination may also be made by acquiring other ratios or indicators based on the programmable switch 103. For example, a data transmission speed, a data packet size, and other parameters may be analyzed, and when these parameters have significant differences with normal values, they may also be used as a basis for network attack detection, which may specifically be selected according to actual needs.

According to embodiments of the present disclosure, the programmable switch transmits the read data and the write data associated with the storage system between the server and the client, and then, for the connection between the client and the programmable switch, determines the compression ratio of the read data and the compression ratio of the write data, and detects a network attack according to the compression ratio of the read data and the compression ratio of the write data. In this way, abnormal data can be quickly and effectively identified without consuming a large quantity of computing resources, and whether a network attack exists can be determined, thereby maintaining the performance of a storage server while reducing the resource consumption of the detection process. In addition, since the detection is performed at the connection level of the programmable switch, when a network attack is detected, the attacked client can be quickly located, which improves the protection level for data security, and also reduces service interruptions caused by false alarms or excessive protection, thereby improving the user experience.

It should be understood that the architecture and functions in the example environment 100 are described only for illustrative purposes, without implying any limitation to the scope of the present disclosure. Embodiments of the present disclosure may also be applied to other environments with different structures and/or functions.

The processes of embodiments of the present disclosure will be described in detail below with reference to FIG. 2 to FIG. 6. For ease of understanding, the specific data mentioned in the following description are all illustrative and are not intended to limit the scope of protection of the present disclosure. It should be understood that the embodiments described below may also include additional actions not shown and/or may omit actions shown, and the scope of the present disclosure is not limited in this regard.

FIG. 2 is a flow chart of a method 200 for detecting a network attack according to some embodiments of the present disclosure. The method 200 may be performed by a programmable network communication device, and the device may be, for example, the programmable switch 103 in the environment 100, or a programmable router. The device functionality may be implemented in software and/or hardware. Next, the method 200 is schematically illustrated by taking the programmable switch 103 as the subject of execution. At a block 202, a storage system of a server is registered with a programmable switch for transmitting and compressing data. For example, as shown in FIG. 1, the storage system of the server 101 may be registered with a protocol layer of the programmable switch 103 for transmitting and compressing data, and an appropriate network protocol and data compression strategy may be configured in the protocol layer. The programmable switch 103 may be used for transmitting data, compressing data, and monitoring network traffic, and its programmability allows the switch to customize optimization solutions according to business requirements. In this way, the programmable switch 103 can monitor the data related to the storage system received and transmitted by the server 101, and discover and solve potential problems in time.

At a block 204, read data and write data associated with the storage system are transmitted between the server and a client by the programmable switch. For example, as shown in FIG. 1, the user may send the read instruction to the programmable switch 103 through the terminal device of the client 105, and the programmable switch 103 retrieves the read data from the server 101 and then sends the data to the user. The user may also perform an operation, such as editing and modifying, on the read data, or generate new data at the client 105 to obtain write data, which is sent back to the server 101 by the programmable switch 103 for storage.

At a block 206, a compression ratio of the read data and a compression ratio of the write data are determined for a connection between the client and the programmable switch. For example, as shown in FIG. 1, read data and write data in a specified period may be periodically acquired for a connection between a terminal device in each client 105 and the programmable switch 103. The programmable switch 103 has a compression function and can compress the read data and the write data transmitted between the client 105 and the server 101. Therefore, based on the programmable switch 103, a compression ratio of the read data and a compression ratio of the write data in a certain period of time may be determined for the terminal device of each client 105.

At a block 208, a network attack is detected based on the compression ratio of the read data and the compression ratio of the write data. For example, as shown in FIG. 1, when a compression ratio of read data requested by a certain terminal device is large, but the terminal device is subjected to a ransomware attack, the read data may be encrypted on the terminal device, so that the user may need to pay for the required data at the next request, and the encrypted data, that is, write data, may not be able to be compressed when it is written back to the server 101. Therefore, whether a network attack exists in the terminal device of the client 105 may be detected by the compression ratio of the read data and the compression ratio of the write data.

In this way, abnormal data can be quickly and effectively identified without consuming a large quantity of computing resources, and whether a network attack exists can be determined, thereby maintaining the performance of a storage server while reducing the resource consumption of the detection process. In addition, since the detection is performed at the connection level of the programmable switch, when a network attack is detected, the attacked client can be quickly located, which improves the protection level for data security, and also reduces service interruptions caused by false alarms or excessive protection, thereby improving the user experience.

Example processes of network attack detection will be illustrated in detail below with reference to FIG. 3 to FIG. 7. In embodiments of the present disclosure, the explanation is performed according to an order of the architecture of the programmable switch, the process of determining the compression ratios of the read data and the write data, the processing process after the network attack is detected, and the analysis method for detecting a network attack. The specific data mentioned in the following description are all illustrative and are not intended to limit the scope of protection of the present disclosure. It should be understood that the embodiments described below may also include additional actions not shown and/or may omit actions shown, and the scope of the present disclosure is not limited in this regard.

Figure 3:
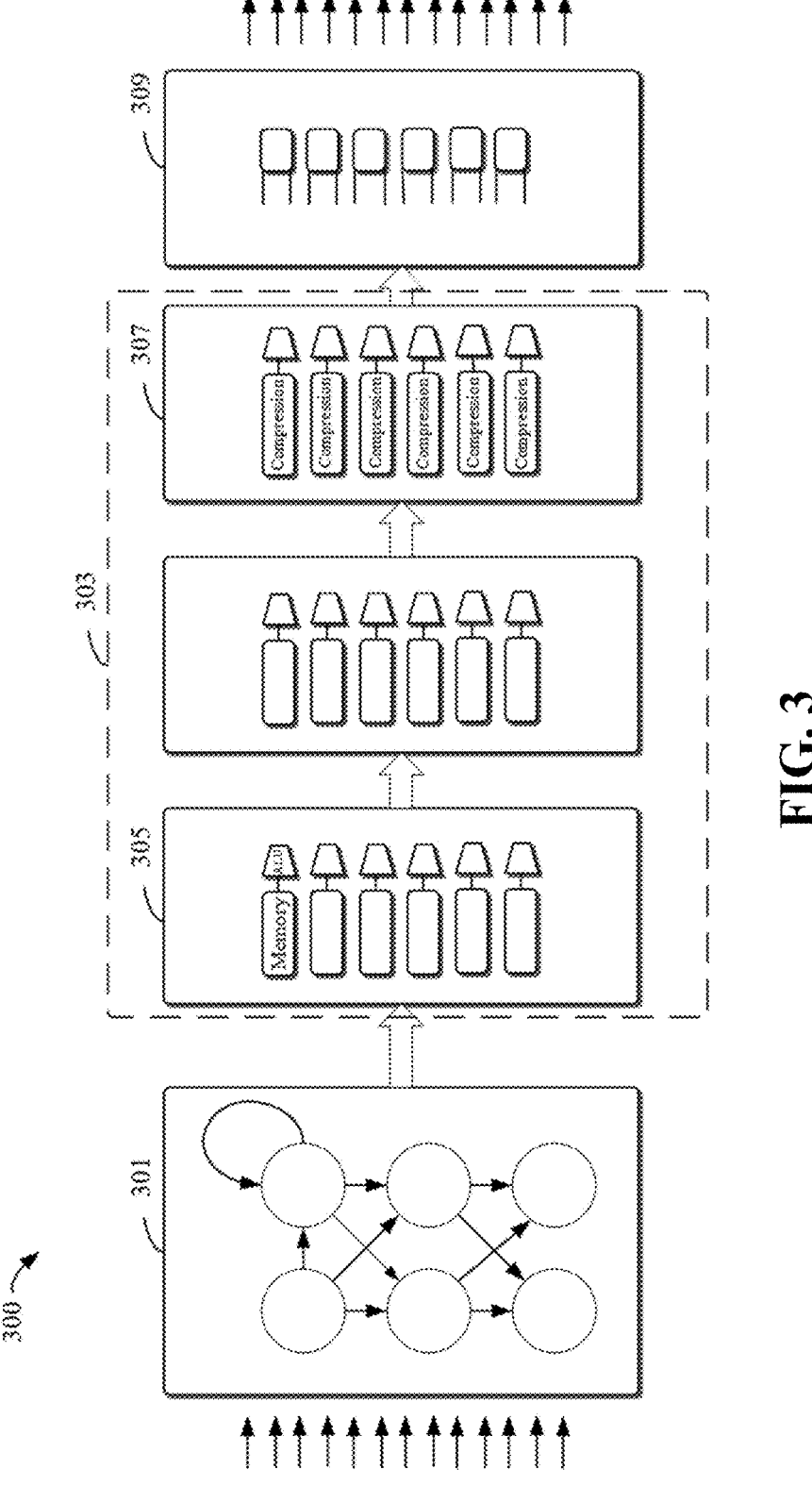
FIG. 3 is a schematic diagram of architecture of a programmable switch according to some embodiments of the present disclosure.

FIG. 3 is a schematic diagram of architecture 300 of a programmable switch according to some embodiments of the present disclosure. As shown in FIG. 3, the programmable switch includes a programmable parser 301, a programmable match-action pipeline 303, and a programmable unpacker 309. The programmable parser 301 can identify and extract read data and write data associated with the storage system, thereby providing an input for subsequent processing stages. After the programmable parser 301 identifies the data, the data may be efficiently transmitted, processed, and monitored between the client and the server by the programmable match-action pipeline 303. By programming to define different matching rules and actions, the programmable match-action pipeline 303 can flexibly handle network traffic, including operations such as reading, writing, compressing, decompressing, and decomposing data.

In some embodiments, the programmable match-action pipeline 303 includes a memory module 305 and a compression module 307, the read data and the write data transmitted and compressed by the programmable match-action pipeline 303 may be stored in the memory module 305, and the memory module 305 may further store a compression ratio of read data and a compression ratio of write data for each terminal device in correspondence with an identifier of the device. This allows the system to quickly access and compare data, thereby facilitating network attack detection. The compression module 307 is used for compressing the read data or the write data to reduce bandwidth usage for network transmission. The compressed, decompressed, or decomposed data may be repackaged by the programmable unpacker 309 into a format suitable for network transmission to send the data to the client or the server. This ensures seamless data transmission and continuity of processing.

Figure 4:
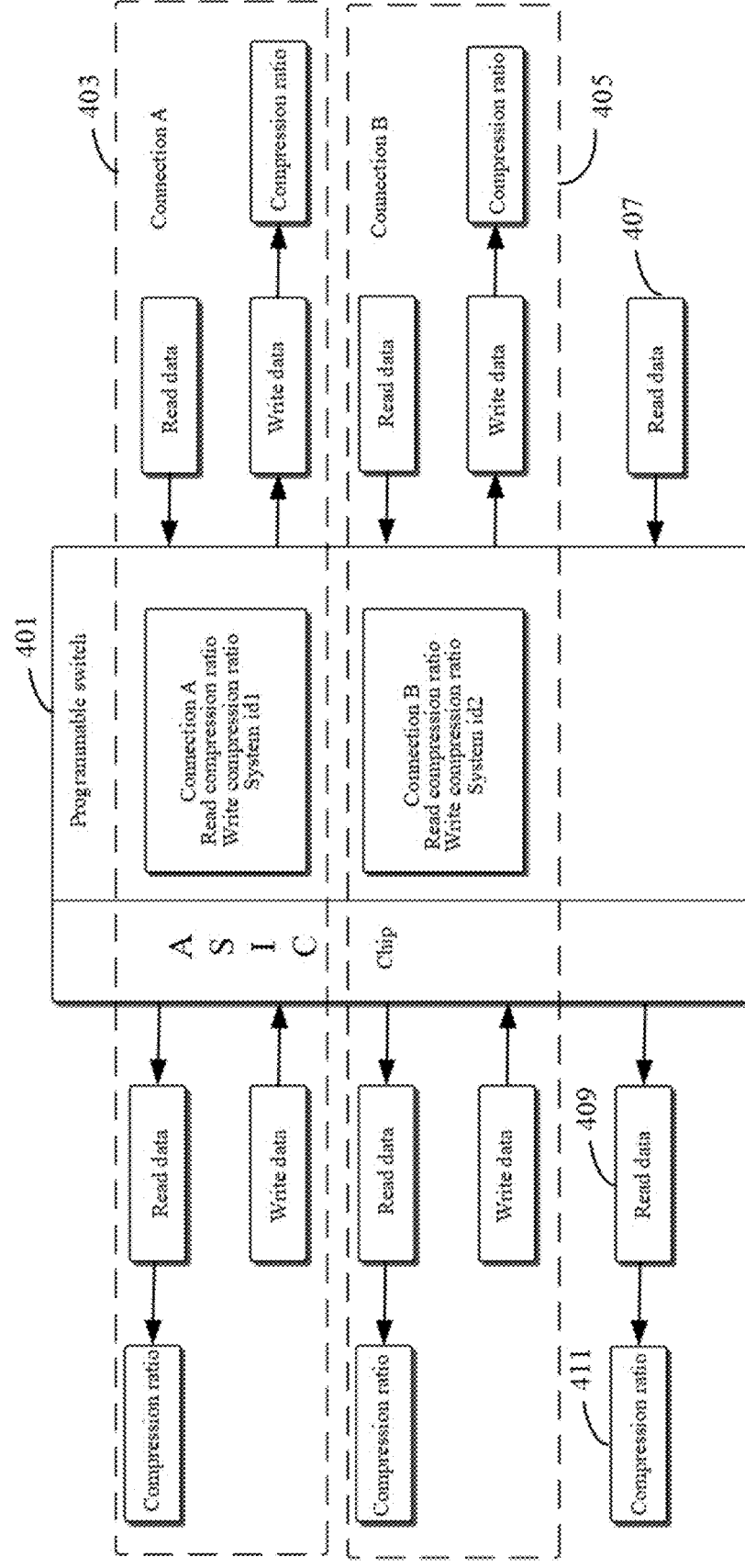
FIG. 4 is a schematic diagram of a process of determining a compression ratio of read data and a compression ratio of write data according to some embodiments of the present disclosure.

FIG. 4 is a schematic diagram of a process 400 of determining a compression ratio of read data and a compression ratio of write data according to some embodiments of the present disclosure. As shown in FIG. 4, a programmable switch 401 is provided with a plurality of physical or virtual interfaces, each interface being correspondingly and independently connectable to a particular device in a client, thereby enabling fine traffic management in a complex network environment. For example, a connection A 403 may correspond to a certain device in the client, and a connection B 405 may correspond to another device in the client. The programmable switch 401 may periodically acquire data streams of read data and write data within a specified period for a connection between the terminal device in each client 105 and the programmable switch 401. The programmable switch 401 has a compression function that can compress the read data and the write data transmitted between the client and the server, and therefore, the read data may include raw read data and compressed read data, and the write data may include raw write data and compressed write data.

In some embodiments, an application-specific integrated circuit (ASIC) chip calculates the compression ratio of the read data according to the raw read data and compressed read data acquired by the terminal device of any client in a specified period, and the ASIC chip calculates the compression ratio, also known as a compression entropy, of the write data according to the raw write data and compressed write data of the terminal device of any client in a certain period of time. For example, raw read data 407 is compressed by the programmable switch 401 to generate compressed read data 409, and a compression ratio 411 may be obtained according to the raw read data 407 and the compressed read data 409. The compression ratio may be calculated according to the following formula:

$$Compression\_Ratio = \frac{Raw\_stream\_size}{Compressed\_stream\_size} \qquad (1)$$

wherein Compression_Ratio represents the compression ratio, Raw_stream_size represents the raw data, and Compressed_stream_size represents the compressed data.

In some embodiments, the above information may be stored in a dictionary of the programmable switch 401 with the connection as a key and with the compression ratio of the read data, the compression ratio of the write data, and the system identifier ("id") as values. For example, for the connection A 403, by using the connection A 403 as the key, the compression ratio of the read data and the compression ratio of the write data corresponding to the connection A 403, as well as the system id of the terminal device may be stored as values in a dictionary of the programmable switch 401. For another example, for the connection B 405, by using the connection B 405 as the key, the compression ratio of the read data and the compression ratio of the write data corresponding to the connection B 405, as well as the system id of the terminal device may be stored as values in a dictionary of the programmable switch 401. In this way, during detecting of a network attack, in the case when an abnormal compression ratio can be detected, the connection and terminal device which are attacked can be located quickly by traversing the stored dictionary, so that the connection can be blocked efficiently, thereby strengthening the data security protection.

Figure 5:
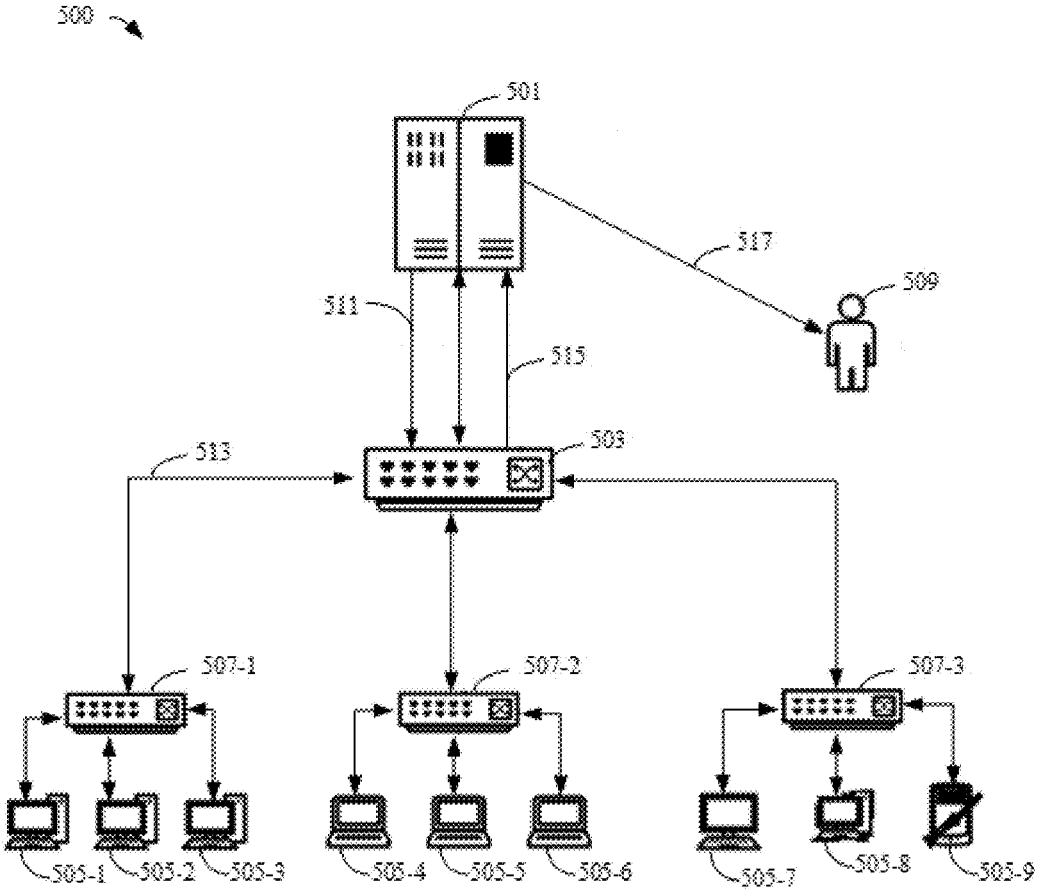
FIG. 5 is a schematic diagram of a process of detecting a network attack and processing the network attack according to some embodiments of the present disclosure.

FIG. 5 is a schematic diagram of a process 500 of detecting a network attack and processing the network attack according to some embodiments of the present disclosure. As shown in FIG. 5, a server 501 is connected to a client through a programmable switch 503, wherein the programmable switch 503 may also be connected to terminal devices of a plurality of clients through a plurality of switches. For example, a terminal device 505-1, a terminal device 505-2, and a terminal device 505-3 may be connected to the programmable switch 503 through a switch 507-1, a terminal device 505-4, a terminal device 505-5, and a terminal device 505-6 may be connected to the programmable switch 503 through a switch 507-2, and a terminal device 505-7, a terminal device 505-8, and a terminal device 505-9 may be connected to the programmable switch 503 through a switch 507-3. A MAC address of each terminal device is stored through a plurality of switches, which is capable of reducing the storage pressure of the programmable switch 503 and improving the network attack detection efficiency. The process of detecting and processing a network attack is explained and illustrated below by taking the terminal device 505-1 as an example, and the specific data mentioned in the following description is all illustrative and is not intended to limit the scope of protection of the present disclosure.

At 511, the server 501 registers the storage system with a protocol layer of the programmable switch 503, so that the programmable switch 503 can transmit, process, and monitor storage system-related data received and transmitted by the server 501. At 513, for each terminal device, read data and write data in a specified period may be periodically acquired by the programmable switch 503, and a compression ratio of the read data and a compression ratio of the write data may be calculated. After the compression ratio of the read data and the compression ratio of the write data of each terminal device are determined, the compression ratio of the read data and the compression ratio of the write data are evaluated, and when a difference between the compression ratio of the read data and the compression ratio of the write data is greater than a threshold, it may be determined that the terminal device 505-1 is subjected to a network attack.

At 515, after a network attack is detected, an alert may be sent to the server 501 by the programmable switch 503, the server 501 may automatically disconnect the terminal device 505-1 according to a predetermined rule, and the server 501 may also respond to the network attack, take a secure snapshot, and fix a previous snapshot to avoid being deleted, the snapshot being a fully available copy of a specified data set at a certain point-in-time. When a storage device fails or data corruption occurs, the snapshot may be used to perform rapid data recovery, thereby restoring the data state to a state when the snapshot is created. At 517, the server 501 may also send an attack signal to an administrator 509 after receiving the alert, the administrator 509 may initiate a data integrity check utility to perform a deep scan of the data after confirming the threat. The data integrity check utility may also be initiated automatically to eliminate the threat, and the administrator 509 may further manually disconnect the terminal device 505-1 using an administrative privilege.

In this way, the network attack detection is implemented at a protocol layer of the programmable switch, without the use of back-end compression, deduplication, and other functions, which simplifies the process of using the storage system. Connection-level-based statistic data is detected, so the connection to the attacker can be accurately identified and blocked without affecting other normal connections. In addition, the present disclosure further saves the CPU and memory resources in an input/output (I/O) path, thereby improving the overall system performance.

Figure 6:
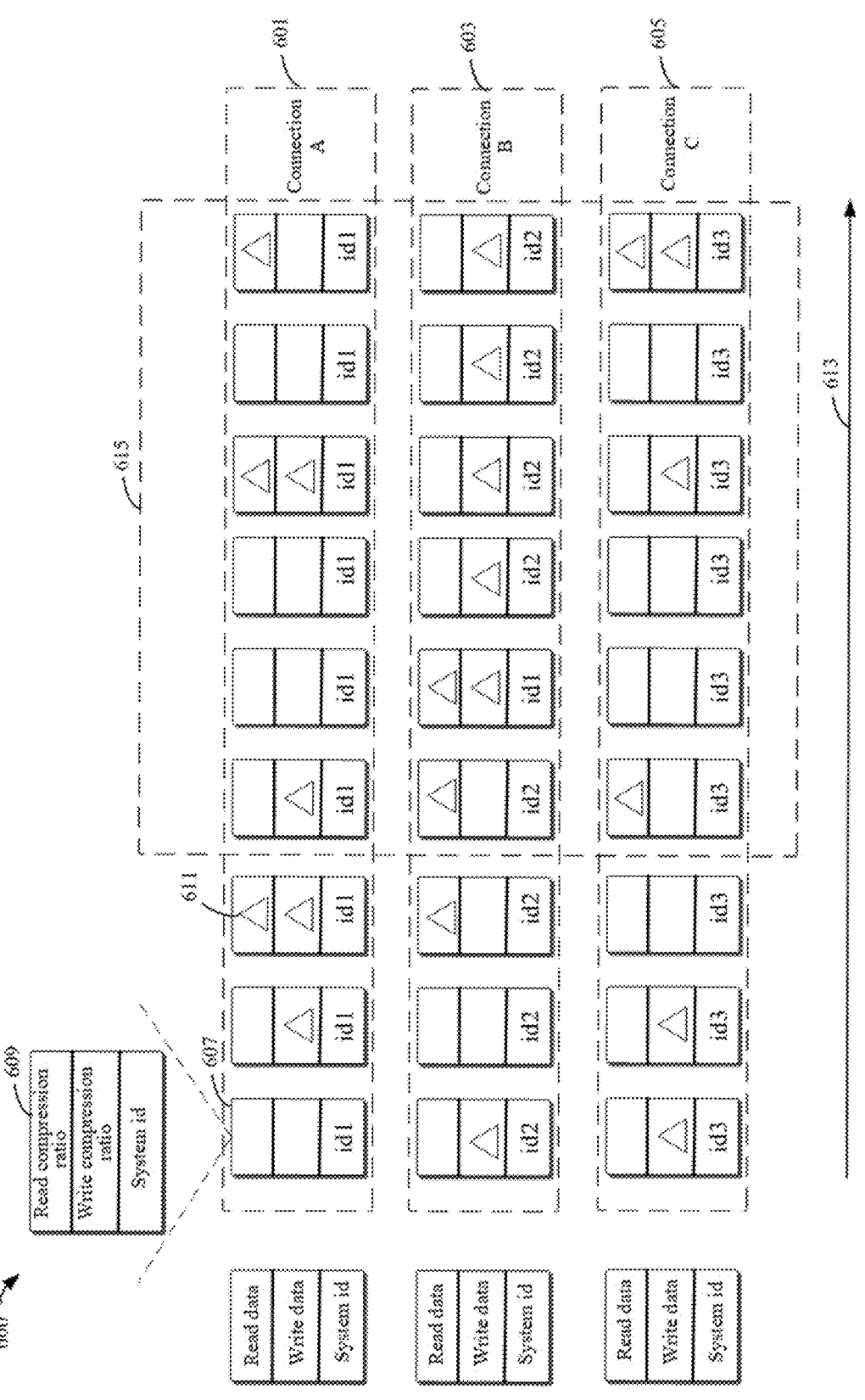
FIG. 6 is a schematic diagram of a memory dictionary in a programmable switch according to some embodiments of the present disclosure.

FIG. 6 is a schematic diagram of a memory dictionary 600 in a programmable switch according to some embodiments of the present disclosure. As shown in FIG. 6, for each connection, the programmable switch calculates and stores a series of associated parameters. By taking a connection A 601 as an example, the programmable switch will generate a group of parameter sets over each preset period of time based on a data stream flowing through it. This group of parameter sets exhaustively includes the compression ratio of read data, the compression ratio of write data, and the system id within the period of time. In particular, each parameter set includes information corresponding to a parameter presentation frame 609. For example, a parameter set 607 includes, from top to bottom, the compression ratio of the read data, the compression ratio of the write data, and the system id.

In embodiments of the present disclosure, a plurality of parameter sets are updated in a direction indicated by an arrow 613, meaning that data gradually tends to the latest status in this direction. As shown in FIG. 6, a triangle 611 indicates that the data is compressed. As can be visually observed from FIG. 6, compared with the connection A 601 and a connection C 605, a compression ratio of write data and a compression ratio of read data of a connection B 603 are consistently different within at least a portion of a detection window 615, illustratively a detection time window, and therefore, it may be determined that a client corresponding to the connection B 603 is subjected to a network attack. In order to accurately detect the network attack and reduce a system false alarm rate, a series of continuous parameter sets within the detection window 615 may be analyzed. This analysis process may be implemented by training a network attack detection model, and the model can learn and use historical read data and historical write data to make an accurate determination.

Figure 7:
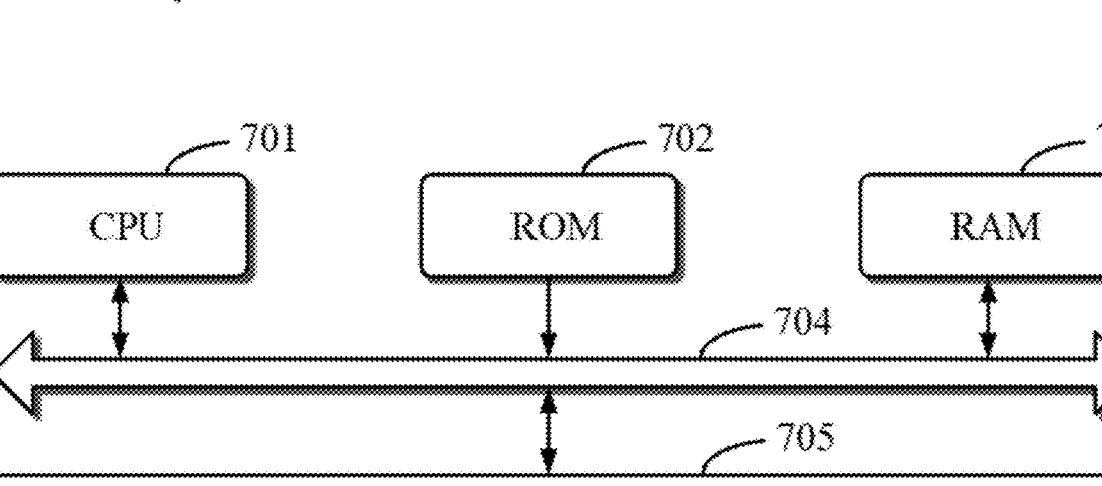
FIG. 7 is a block diagram of a server that can implement embodiments of the present disclosure.

FIG. 7 is a block diagram of an example server 700 that can be used to implement embodiments of the present disclosure. As shown in the figure, the server 700 includes a computing unit 701, illustratively comprising at least one central processing unit (CPU), which may perform various appropriate actions and processing according to computer program instructions stored in a read only memory (ROM) 702 or computer program instructions loaded from a storage unit 708 to a random access memory (RAM) 703. Various programs and data required for operations of the server 700 may also be stored in the RAM 703. The computing unit 701, the ROM 702, and the RAM 703 are connected to each other via a bus 704. An input/output (I/O) interface 705 is also connected to the bus 704.

A plurality of components in the server 700 are connected to the I/O interface 705, including: an input unit 706, such as a keyboard and a mouse; an output unit 707, such as various types of displays and speakers; the storage unit 708, such as a magnetic disk and an optical disc; and a communication unit 709, such as a network card, a modem, and a wireless communication transceiver. The communication unit 709 allows the server 700 to exchange information/data with other devices via a computer network, such as the Internet, and/or various telecommunication networks.

The computing unit 701 may be various general-purpose and/or special-purpose processing components with processing and computing powers. Some examples of the computing unit 701 include, but are not limited to, the above-noted one or more CPUs, graphics processing units (GPUs), various specialized artificial intelligence (AI) computing chips, various computing units for running machine learning model algorithms, digital signal processors (DSPs), and any appropriate processors, controllers, microcontrollers, etc. The computing unit 701 implements the steps performed by the server 700 described above, such as taking a snapshot. For example, in some embodiments, the steps performed by the server 700 may be implemented as a computer software program that is tangibly included in a machine-readable medium, such as the storage unit 708. In some embodiments, part of or all the computer program may be loaded and/or installed onto the server 700 via the ROM 702 and/or the communication unit 709. When the computer program is loaded into the RAM 703 and executed by the computing unit 701, the steps performed by the server 700 described above may be performed. Alternatively, in other embodiments, the computing unit 701 may be configured in any other suitable manner (for example, by means of firmware) to perform the steps performed by the server 700.

The functions described herein can be performed at least in part by one or more hardware logic components. For example, non-restrictively, demonstration types of hardware logic components that can be used include Field Programmable Gate Arrays (FPGAs), Application Specific Integrated Circuits (ASICs), Application Specific Standard Parts (AS-SPs), Systems On Chip (SOC), Complex Programmable Logic Devices (CPLDs), etc.

Program code for implementing the method of the present disclosure may be written by using one programming language or any combination of multiple programming languages. The program code may be provided to a processor or controller of a general-purpose computer, a special-purpose computer, or another programmable data processing apparatus, such that the program code, when executed by the processor or controller, cause the functions/operations specified in the flow charts and/or block diagrams to be implemented. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include one or more wire-based electrical connections, a portable computer diskette, a hard disk, RAM, ROM, an erasable programmable read-only memory (EPROM or flash memory), an optical fiber, a portable compact disc read-only memory (CD-ROM), an optical storage device, a magnetic storage device, or any suitable combination thereof. Additionally, although operations are depicted in a particular order, this should not be construed as an indication that such operations are required to be performed in the particular order shown or in a sequential order, or that all illustrated operations should be performed to achieve desirable results. In certain environments, multitasking and parallel processing may be advantageous. Likewise, although the above description contains several specific implementation details, these should not be construed as limitations to the scope of the present disclosure. Certain features that are described in the context of separate embodiments may also be implemented in combination in a single implementation. In contrast, various features that are described in the context of a single implementation may also be implemented in multiple implementations separately or in any suitable sub-combination.

Although the present subject matter has been described using a language specific to structural features and/or method logical actions, it should be understood that the subject matter defined in the following claims is not necessarily limited to the particular features or actions described above. Rather, the specific features and actions described above are merely example forms of implementing the claims.

What is claimed is:

1. A method for detecting a network attack, comprising:
   registering a storage system of a server with a programmable switch for transmitting and compressing data;
   transmitting read data and write data associated with the storage system between the server and a client by the programmable switch;
   determining a compression ratio of the read data and a compression ratio of the write data for a connection between the client and the programmable switch; and
   detecting the network attack based on the compression ratio of the read data and the compression ratio of the write data.

2. The method according to claim 1, wherein determining the compression ratio of the read data and the compression ratio of the write data comprises:
   determining, for a first connection between a first client and the programmable switch, inbound raw read data, outbound compressed read data, inbound raw write data, and outbound compressed write data in the programmable switch;
   determining a compression ratio of first read data of the first connection based on the raw read data and the compressed read data; and
   determining a compression ratio of first write data of the first connection based on the raw write data and the compressed write data.

3. The method according to claim 1, wherein detecting the network attack comprises:
   determining whether a difference between the compression ratio of the read data and the compression ratio of the write data is greater than a threshold; and
   determining, in response to the difference being greater than the threshold, that a client as a source of the write data is subjected to a network attack.

4. The method according to claim 3, further comprising:
   locating the client based on a connection between the client subjected to a network attack and the programmable switch; and
   disconnecting, by the programmable switch, the client from the server automatically.

5. The method according to claim 3, further comprising:
   sending, in response to the difference being greater than the threshold, a network attack alert to the server by the programmable switch.

6. The method according to claim 5, further comprising:

triggering, in response to the network attack being detected, fixation of a snapshot taken in the storage system for data back-up and recovery and taking of a new snapshot.

7. The method according to claim 5, further comprising:

triggering, in response to the network attack being detected, sending of a network attack signal to an administrator;

disconnecting, based on an administrative privilege of the administrator, the client from the server; and scanning the read data and the write data between the client and the server.

8. The method according to claim 1, wherein detecting the network attack comprises:

acquiring historical read data and historical write data between the server and the client subjected to the network attack;

training a network attack detection model based on the historical read data and the historical write data; and detecting, by the trained network attack detection model, the network attack based on the compression ratio of the read data and the compression ratio of the write data.

9. The method according to claim 1, wherein the programmable switch is connected to the client through a plurality of switches corresponding to a plurality of client devices.

10. A programmable switch, comprising:

at least one processor; and memory coupled to the at least one processor and having instructions stored therein, wherein the instructions, when executed by the at least one processor, cause the programmable switch to perform actions comprising:

transmitting read data and write data associated with a storage system between a server and a client;

determining a compression ratio of the read data and a compression ratio of the write data for a connection between the client and the programmable switch; and detecting a network attack based on the compression ratio of the read data and the compression ratio of the write data.

11. The programmable switch according to claim 10, wherein determining the compression ratio of the read data and the compression ratio of the write data comprises:

determining, for a first connection between a first client and the programmable switch, inbound raw read data, outbound compressed read data, inbound raw write data, and outbound compressed write data in the programmable switch;

determining a compression ratio of first read data of the first connection based on the raw read data and the compressed read data; and determining a compression ratio of first write data of the first connection based on the raw write data and the compressed write data.

12. The programmable switch according to claim 10, wherein detecting the network attack comprises:

determining whether a difference between the compression ratio of the read data and the compression ratio of the write data is greater than a threshold; and determining, in response to the difference being greater than the threshold, that a client as a source of the write data is subjected to a network attack.

13. The programmable switch according to claim 12, wherein the actions further comprise:

locating the client based on a connection between the client subjected to a network attack and the programmable switch; and disconnecting, by the programmable switch, the client from the server automatically.

14. The programmable switch according to claim 12, wherein the actions further comprise:

sending, in response to the difference being greater than the threshold, a network attack alert to the server by the programmable switch.

15. The programmable switch according to claim 14, wherein the actions further comprise:

triggering, in response to the network attack being detected, fixation of a snapshot taken in the storage system for data back-up and recovery and taking of a new snapshot.

16. The programmable switch according to claim 14, wherein the actions further comprise:

triggering, in response to the network attack being detected, sending of a network attack signal to an administrator;

disconnecting, based on an administrative privilege of the administrator, the client from the server; and scanning the read data and the write data between the client and the server.

17. The programmable switch according to claim 10, wherein detecting the network attack comprises:

acquiring historical read data and historical write data between the server and the client subjected to the network attack;

training a network attack detection model based on the historical read data and the historical write data; and detecting, by the trained network attack detection model, the network attack based on the compression ratio of the read data and the compression ratio of the write data.

18. The programmable switch according to claim 10, wherein the programmable switch is connected to the client through a plurality of switches corresponding to a plurality of client devices.

19. A computer program product tangibly stored on a non-transitory computer-readable medium and comprising machine-executable instructions, wherein the machine-executable instructions, when executed by a machine, cause the machine to perform actions comprising:

registering a storage system of a server with a programmable switch for transmitting and compressing data;

transmitting read data and write data associated with the storage system between the server and a client by the programmable switch;

determining a compression ratio of the read data and a compression ratio of the write data for a connection between the client and the programmable switch; and detecting a network attack based on the compression ratio of the read data and the compression ratio of the write data.

20. The computer program product according to claim 19, wherein determining the compression ratio of the read data and the compression ratio of the write data comprises:

determining, for a first connection between a first client and the programmable switch, inbound raw read data, outbound compressed read data, inbound raw write data, and outbound compressed write data in the programmable switch;

determining a compression ratio of first read data of the first connection based on the raw read data and the compressed read data; and determining a compression ratio of first write data of the first connection based on the raw write data and the compressed write data.

* * * * *